(12) United States Patent
Kowatari et al.

(10) Patent No.: US 10,017,112 B2
(45) Date of Patent: Jul. 10, 2018

(54) SURROUNDINGS MONITORING DEVICE OF VEHICLE

(71) Applicant: Hitachi Construction Machinery Co., Ltd., Tokyo (JP)

(72) Inventors: Yoichi Kowatari, Kasumigaura (JP);
Yukihiro Kawamata, Hitachi (JP);
Yoshihiro Inanobe, Kasumigaura (JP);
Moritaka Oota, Abiko (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/506,871

(22) PCT Filed: Feb. 5, 2016

(86) PCT No.: PCT/JP2016/053549
§ 371 (c)(1),
(2) Date: Feb. 27, 2017

(87) PCT Pub. No.: WO2016/140016
PCT Pub. Date: Sep. 9, 2016

(65) Prior Publication Data
US 2017/0282794 A1    Oct. 5, 2017

(30) Foreign Application Priority Data

Mar. 3, 2015   (JP) .................................. 2015-041528
Mar. 10, 2015  (JP) .................................. 2015-047325

(51) Int. Cl.
*B60Q 9/00* (2006.01)
*G01S 7/03* (2006.01)
(Continued)

(52) U.S. Cl.
CPC .............. *B60Q 9/008* (2013.01); *G01S 7/032* (2013.01); *G01S 13/931* (2013.01); *H01Q 1/3233* (2013.01)

(58) Field of Classification Search
None
See application file for complete search history.

(56) References Cited

U.S. PATENT DOCUMENTS

2006/0055525 A1 * 3/2006 Kubota ................ G08G 1/0962
340/461
2007/0073474 A1 * 3/2007 Nakamura ........... G01C 21/367
701/431
(Continued)

FOREIGN PATENT DOCUMENTS

JP    2002-027433 A    1/2002
JP    2002-176641 A    6/2002
(Continued)

OTHER PUBLICATIONS

International Search Report of PCT/JP2016/053549 dated Mar. 22, 2016.

*Primary Examiner* — Quan-Zhen Wang
*Assistant Examiner* — Chico A Foxx
(74) *Attorney, Agent, or Firm* — Mattingly & Malur, PC (57) ABSTRACT

When a to-be-monitored image exists in an image lacking from a bird's-eye image for surroundings monitoring though the to-be-monitored image is imaged by a camera for monitoring, the to-be-monitored image is securely displayed on a display. Cameras 6F, 6B, 6L, 6R are provided in a longitudinal direction and in a lateral direction of a dump truck 1, in playing bird's-eye images 10F, 10B, 10L, 10R acquired by converting view points of a through image imaged by each camera, so as to display a to-be-monitored image in a to-be-monitored image undisplayable area, each through image imaged by each camera is aggregated on one (Continued)

screen by an image aggregating unit 21, this aggregated screen is scanned by a to-be-monitored image detector 20 to detect the to-be-monitored image, and the to-be-monitored image is superimposed on a synthetic bird's-eye image 10 displayed on the display 9 and is displayed.

4 Claims, 9 Drawing Sheets

(51) Int. Cl.
*G01S 13/93* (2006.01)
*H01Q 1/32* (2006.01)

(56) References Cited

U.S. PATENT DOCUMENTS

| | | | | |
|---|---|---|---|---|
| 2007/0147664 A1* | 6/2007 | Kubota | ............... | B60W 40/04 |
| | | | | 382/106 |
| 2011/0320042 A1* | 12/2011 | Handelman | ............... | B25J 5/005 |
| | | | | 700/275 |
| 2012/0113307 A1* | 5/2012 | Watanabe | ............... | H04N 5/23219 |
| | | | | 348/333.01 |
| 2013/0027559 A1* | 1/2013 | Edwards | ............... | G01S 7/062 |
| | | | | 348/148 |
| 2013/0158786 A1* | 6/2013 | Fukano | ............... | E02F 9/264 |
| | | | | 701/34.4 |
| 2013/0298077 A1* | 11/2013 | Hirota | ............... | G06F 3/0481 |
| | | | | 715/801 |
| 2013/0300872 A1* | 11/2013 | Park | ............... | B60R 1/00 |
| | | | | 348/148 |
| 2014/0111648 A1* | 4/2014 | Ishimoto | ............... | B60R 1/00 |
| | | | | 348/148 |
| 2014/0267803 A1* | 9/2014 | Shintani | ............... | H04N 5/23293 |
| | | | | 348/208.2 |
| 2015/0091898 A1* | 4/2015 | Tanaka | ............... | G05B 19/4061 |
| | | | | 345/419 |
| 2015/0138356 A1* | 5/2015 | Kowatari | ............... | B60R 1/00 |
| | | | | 348/144 |
| 2015/0307024 A1* | 10/2015 | Fukuda | ............... | B60Q 9/008 |
| | | | | 382/103 |
| 2016/0273195 A1* | 9/2016 | Chang | ............... | E02F 9/26 |
| 2016/0321920 A1* | 11/2016 | Hayasaka | ............... | G08G 1/166 |
| 2017/0016210 A1* | 1/2017 | Kowatari | ............... | B60R 1/00 |

FOREIGN PATENT DOCUMENTS

| | | |
|---|---|---|
| JP | 2007-295043 A | 11/2007 |
| JP | 2010-204821 A | 9/2010 |

\* cited by examiner

SURROUNDINGS MONITORING DEVICE OF VEHICLE

TECHNICAL FIELD

The present invention relates to a surroundings monitoring device of a vehicle for monitoring surroundings of the vehicle when the vehicle such as industrial machinery including a hydraulic excavator, a dump truck and a road work machine is operated.

BACKGROUND ART

For industrial machinery, a hydraulic excavator as a work machine for excavating earth and sand, for example, can be given and besides, for haulage machinery that hauls the earth and sand excavated by the hydraulic excavator, a dump truck can be given. The hydraulic excavator and the dump truck are a moving vehicle and a moving vehicle provided with a surroundings monitoring device that monitors surroundings of the vehicle in work has been heretofore widely known. For a concrete configuration of the surroundings monitoring device, generally, the vehicle is equipped with cameras and besides, in a cab, a display is installed in a position in front of a driver's seat for an operator to sit. Images acquired by the cameras are displayed on a display screen in the shape of a dynamic image.

To acquire a visual field in a wide range around the vehicle, revolving upperstructure is equipped with plural cameras. To eliminate a dead angle in a monitoring visual field substantially all around the vehicle displayed on the display, a configuration that view points are converted by processing monitor images of surroundings acquired by the plural cameras according to a signal and the monitor images are displayed on the display screen as a top view monitor image acquired by projection onto a plane is disclosed in a patent literature 1. In this patent literature 1, industrial machinery as an object is a hydraulic excavator and cameras are installed in total three locations of a rear position and positions on both right and left sides of the hydraulic excavator. As an operator is directly visible as to the front side of the hydraulic excavator, a forward image is not imaged in the patent literature 1, however, industrial machinery provided with a camera in a front position is also known.

An optical axis of an imaging lens of the above-mentioned each camera is directed diagonally downward. Images imaged by each camera are through images and images acquired by converting view points to be upper view points on the basis of these through images are bird's-eye images acquired by projection from the upside of the vehicle.

The bird's-eye images are displayed on the display screen, however, at this time, an illustration (a planar image showing the hydraulic excavator) acquired by symbolizing the hydraulic excavator is displayed on the display screen as a vehicle icon and the bird's-eye image acquired by each camera is arranged around the vehicle icon. In the patent literature 1, the vehicle icon is displayed in a central position of the display screen, each upper view point image is arranged in a rear area and in areas on the right and left sides of the vehicle icon, and a synthetic bird's-eye image as surroundings monitoring is displayed.

CITATION LIST

Patent Literature

Patent Literature 1: JP-A No. 2010-204821

SUMMARY OF INVENTION

Technical Problem

A circumferential situation of the hydraulic excavator (another industrial machinery displaying a monitor image is also similar) is displayed by displaying the synthetic bird's-eye image around the vehicle icon as a planar image, and it can be determined in which direction and how far a person and a thing to be obstruction of operation exist and whether the vehicle has possibility of contact with them depending upon an operating state or not. In addition, as an operator is not required to change his/her attitude and to move for surroundings monitoring with the operator seated on a driver's seat, usability for surroundings monitoring is high. In this case, the display is fixedly provided inside a cab, however, the display may be also a head mounted display which the operator can wear.

Incidentally, as a surroundings monitoring image is displayed on the display having a finite display area, moreover, the plural cameras are provided in different locations and a direction of a visual field of each camera is different, the surroundings monitoring device disclosed in the patent literature 1 is not necessarily perfect.

That is, individual bird's-eye images acquired by converting viewpoints of images from three (or four including the front side) cameras to upper view points are respectively trimmed and are pasted on each area formed around a vehicle illustration displayed on the display. Accordingly, to display as individual bird's-eye images, a part of the image is cut off. Moreover, each image is displayed with each image pasted together, however, a boundary is made in pasting. As the cameras are arranged in different positions and image video from different directions, an image required for monitoring, that is, a to-be-monitored image requiring monitoring that collides or may collide when the hydraulic excavator is operated may exist in a part cut off from an image to be displayed in trimming.

In general, to prevent an area not imaged by any camera, that is, a blind area from being caused, plural cameras are used for surroundings monitoring. Accordingly, positional relation among each camera is adjusted, a wide angle lens is used for each camera, and visual fields of the adjacent cameras are made mutually overlapped.

Though the to-be-monitored image is imaged by any camera as an object, the to-be-monitored image may be not displayed on the display. As the display area of the display has a limit and images by two cameras different in a direction of the visual field are displayed with the images pasted together, a part lacking from an image displayed on the display exists. That is, a position outside the display area of the display and a position of a boundary between each bird's-eye image are a display lacking location and a to-be-monitored image is located in the display lacking location, the to-be-monitored image is not displayed on the display.

The present invention is made in view of the above-mentioned problem and an object is to securely display a to-be-monitored image on a display even if the to-be-monitored image exists in an image lacking from a bird's- eye image displayed on the display for surroundings monitoring though the to-be-monitored image is imaged by the camera.

Solution to Problem

To settle the above-mentioned problem, the present invention is based upon a surroundings monitoring device of a vehicle where plural cameras are provided around the vehicle as industrial machinery, a bird's-eye image is created by converting view points of a through image imaged by each camera, the vehicle is displayed as a vehicle icon on a display and each bird's-eye image is displayed in a limited display area around the vehicle icon as a synthetic bird's-eye image. The present invention has a characteristic that the surroundings monitoring device of the vehicle according to the present invention is provided with an image aggregating unit that aggregates each through image imaged by each camera on one screen, a to-be-monitored image detector that detects a coordinate position on the synthetic bird's-eye image of a to-be-monitored image to be an object of surroundings monitoring on the basis of the image aggregated by the image aggregating unit and an image synthesizer that displays the to-be-monitored image detected by the to-be-monitored image detector on the display.

Advantageous Effects of Invention

When a to-be-monitored image exists in a position in which the to-be-monitored image lacks from the bird's-eye image for surroundings monitoring displayed on the display though the to-be-monitored image is imaged by plural cameras provided to the vehicle, the to-be-monitored image can be securely displayed on the display.

DESCRIPTION OF EMBODIMENT

Referring to the drawings, an embodiment of the present invention will be described below. In this case, for industrial machinery, a dump truck to which the present invention is applied as a vehicle that hauls ore in a mine is given. However, a vehicle as industrial machinery is not limited to this type dump truck, and the present invention can be also applied to a hydraulic excavator and the other working machines which are a vehicle provided with an undercarriage having a travel base and provided with revolving upper structure having working means for working such as excavating earth and sand on the undercarriage. Moreover, the dump truck has two types of a rigid type and an articulated type, and the present invention may be applied to both types. In short, a surroundings monitoring device equivalent to this embodiment can be applied to an arbitrary vehicle for performing predetermined work (haulage and excavation). In the following description, "left" denotes the left in a forward view from a cab and "right" denotes the right in a view from the cab.

Figure 1:
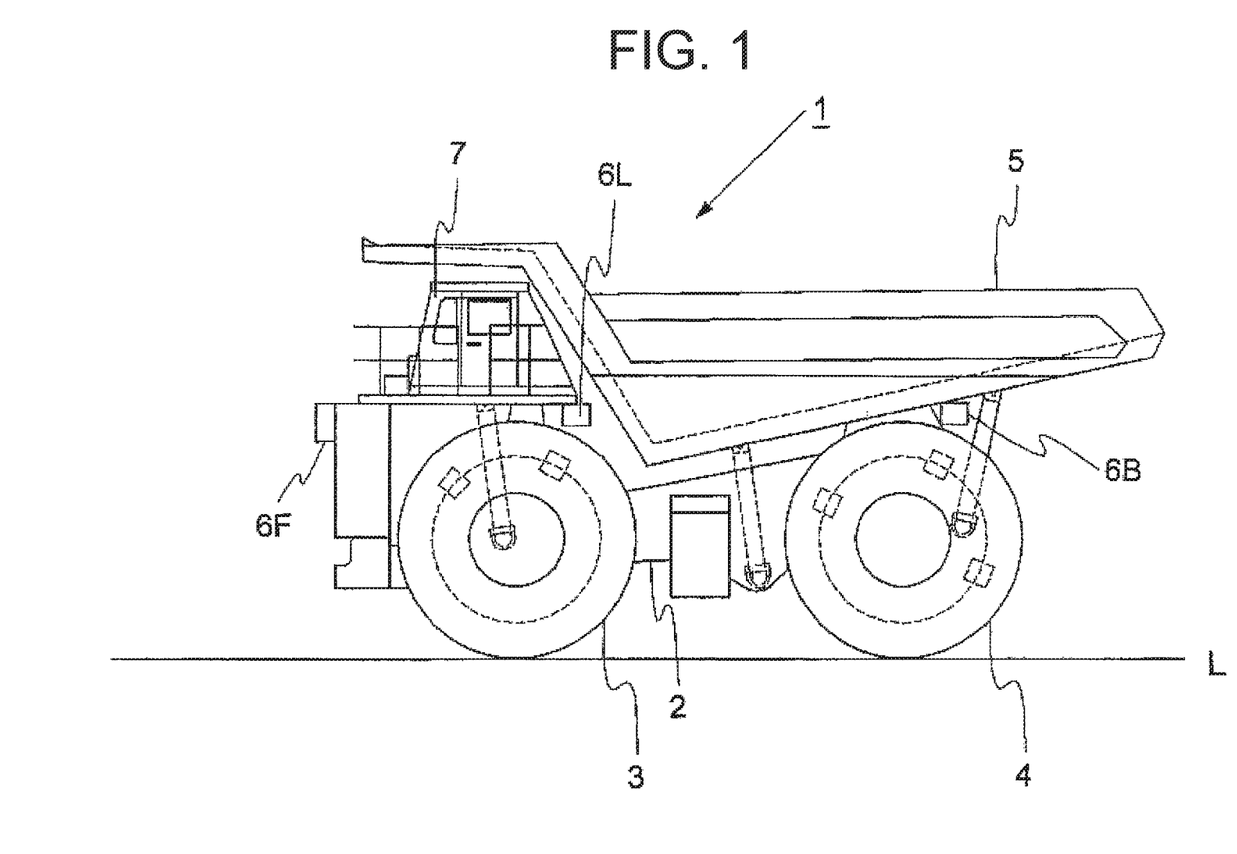
FIG. 1 is a side view showing a dump truck as one example of industrial machinery.
Figure 2:
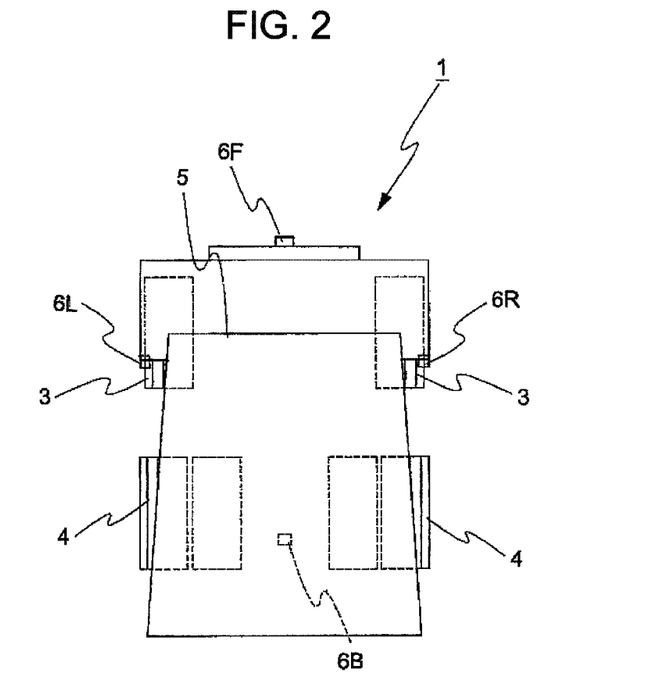
FIG. 2 is a plan view showing a hydraulic excavator shown in FIG. 1.

FIG. 1 and FIG. 2 show schematic configuration of a dump truck 1. The dump truck 1 is basically configured by a body frame 2, a front wheel 3, a rear wheel 4 and a dump body 5. Cameras 6F, 6B, 6R, 6L as imaging means are provided to the dump truck 1 in four locations. The cameras 6F, 6B, 6R, 6L (in the following description, unless a position of the camera is specified, a camera 6 is used) are provided in front of the cab 7, at the back of the cab and on both right and left sides of the cab.

The body frame 2 configures a body of the dump truck 1, the front wheel 3 is provided in front of the body frame 2, and the rear wheel 4 is provided at the back of the body frame. A pair of right and left front wheels 3 and a pair of right and left rear wheels 4 are provided. The dump body 5 is a load body and is provided to load earth, sand and minerals. The dump body 5 is configured so that earth, sand and minerals are loaded in a horizontal state and can be unloaded backward by tilting operation.

Figure 3:
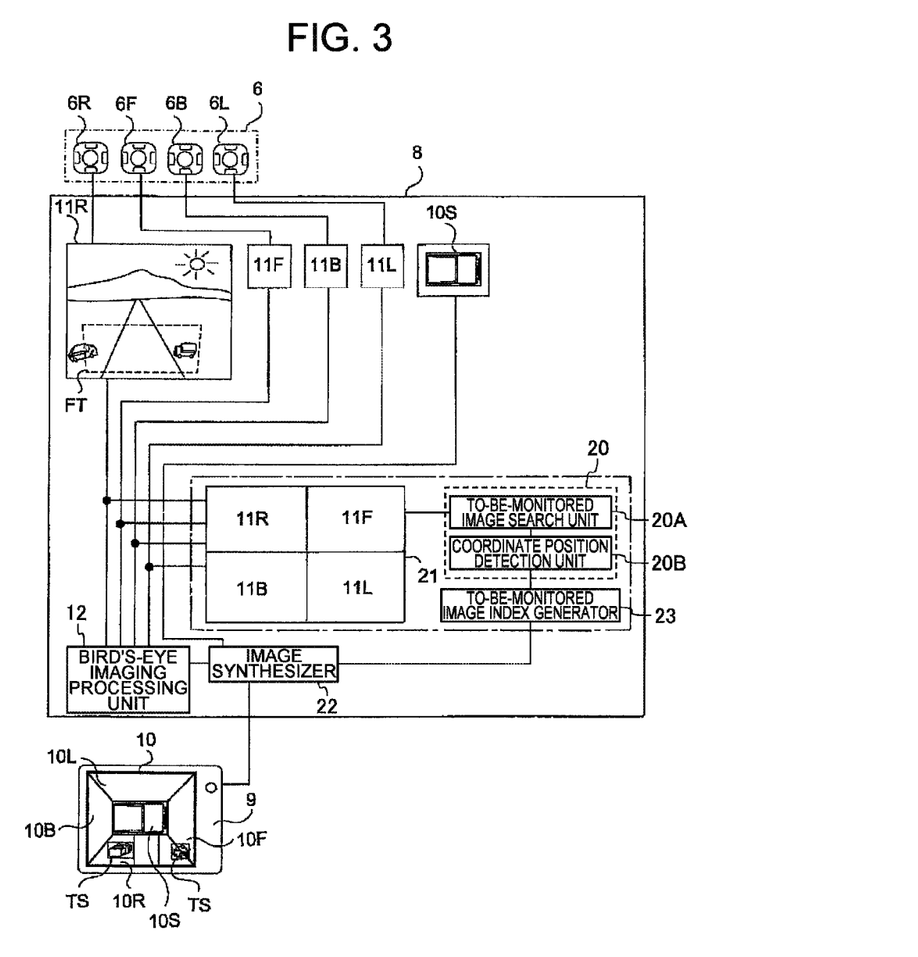
FIG. 3 is a block diagram showing the whole surroundings monitoring device of the dump truck.

The cab 7 is provided with various operating means for a driver to operate the dump truck 1 aboard. For example, a shift lever and others for advancing or retreating the dump truck 1 are provided as the operating means. The cab 7 is provided with an image processor 8 and a display 9 as shown in FIG. 3. Surroundings of the dump truck 1 are imaged by the cameras 6F, 6B, 6R, 6L provided to each position in a longitudinal direction and in a lateral direction of the dump truck 1 and predetermined image processing is applied to their picture signals in the image processor 8. Video data output from the image processor 8 is displayed on the display 9 in a state of a dynamic image.

In this case, a dynamic image is displayed on the display 9, however, an image configuring video when the the image is acquired by the camera 6 is a through image. These through images are output picture signals from imaging means of the camera 6, however, it is a synthetic bird's-eye image 10 shown in FIG. 4 that is displayed on the display 9. The synthetic bird's-eye image 10 is displayed as an image acquired by viewing the dump truck 1 and a situation around the dump truck from the upside.

Figure 4:
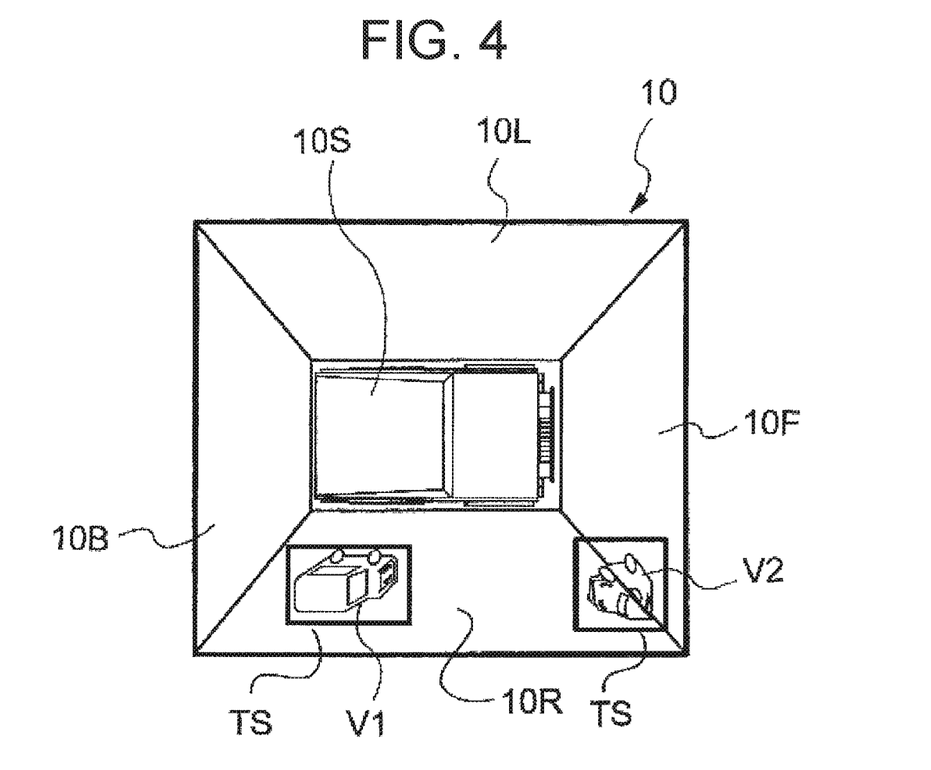
FIG. 4 is an illustration showing a display image of a display provided to the dump truck.

The camera 6 images with its optical axis directed diagonally downward, however, the synthetic bird's-eye image 10 is acquired by converting view points of camera images (through images) 11F, 11B, 11R, 11L to be upper view points and its dynamic image is displayed. The synthetic bird's-eye image 10 is an image acquired by setting a virtual plane and projecting onto the virtual plane in a visual line from the upside. The virtual plane can be arbitrarily set, however, in this embodiment, a ground plane L of the dump truck 1 is set as the virtual plane.

Four individual bird's-eye images and a vehicle icon 10S showing a reduced image or an illustration of the dump truck 1 are generated by installing the four cameras 6F, 6B, 6R, 6L on the dump truck 1 and converting the through images 11F, 11B, 11R, 11L acquired from the respective cameras from actual view points to respective upper viewpoints by a bird's-eye imaging processing unit 12. The synthetic bird's-eye image 10 that seems to overlook the dump truck 1 and its surroundings is displayed by arranging the vehicle icon 10S in the center of the display 9 and displaying each individual bird's-eye image 10F, 10B, 10R, 10L around the vehicle icon 10S.

To prevent display of the display 9 from including a dead angle, a wide angle lens is used for widening a visual field of each camera 6F, 6B, 6R, 6L to 90 degrees or more, for example, between 120 and 180 degrees, and the visual field of each camera 6F, 6B, 6R, 6L is partially overlapped. Moreover, the vehicle icon 10S can be also made undisplayed, however, the display of the vehicle icon 10S is advantageous in enabling being used for a key for an operator to check a surrounding situation, especially to check a monitoring range, a direction of the vehicle and others.

The display 9 is provided in the cab 7 of the dump truck 1 and an operator can precisely grasp a situation around the dump truck 1 by viewing the display of the display 9 with his/her eyes. That is, positions of a person and a thing located around the dump truck 1 can be precisely recognized by displaying the synthetic bird's-eye image 10.

Consequently, the operator can precisely grasp a situation of a work site in which the dump truck 1 is operated, the operator checks whether a worker and others exist around the dump truck 1 or not, whether another vehicle is located or not and further, whether various equipment, further, constructions and the other objects exist around the dump truck or not, the operator can smoothly operate the dump truck 1, and the operator can operate the dump truck, avoiding contact with a person and an object. Accordingly, it can be said that the synthetic bird's-eye image 10 is an image for monitoring surroundings of the dump truck 1.

Figure 5A:
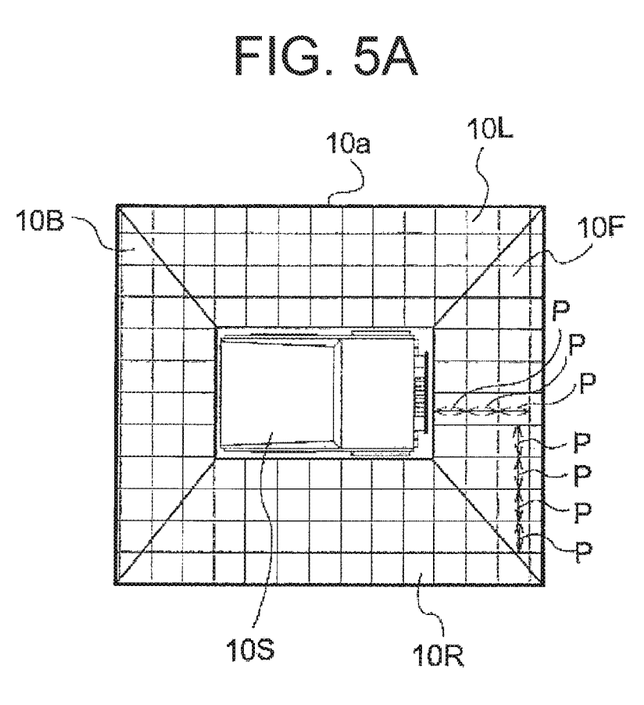
FIG. 5A is an illustration showing display of a planar bird's-eye image being one mode of a bird's-eye image display method.
Figure 5B:
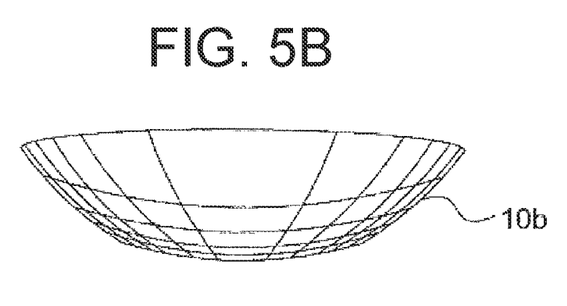
FIG. 5B is an illustration showing display of a spherical bird's-eye image being another mode of the bird's-eye image display method.

To display a bird's-eye image on a screen of the display 9, some display methods can be given. For typical methods, a planar bird's-eye image shown in FIG. 5A and a spherical bird's-eye image shown in FIG. 5B can be given. The planar bird's-eye image has an equal interval P in a direction of the depth and in a direction of the width of the bird's-eye image on the screen according to a display mode shown in FIG. 5A. In the meantime, the spherical bird's-eye image shown in FIG. 5B is an image 10b having a spherical spread according to a display mode showing a concave spherical shape in a perspective direction and in the direction of the width from the center, and both display modes can be also adopted. In the first place, as a super-wide-angle lens is used for the camera 6 for monitoring the surroundings, an image distorted from an optical axis center toward a circumference is acquired and an actually acquired image has spherical distortion from the optical axis center into the direction of the width and in the perspective direction, however, a planar image is acquired by correcting this spherical distortion.

Then, a planar bird's-eye image process method will be described, referring to FIGS. 6A to 6E below. FIGS. 6A to 6E show a process for bird's-eye imaging on the basis of a through image imaged by the camera 6R installed on the right side and the bird's-eye imaging processing unit 12 individually processes a through image of each camera 6F, 6B, 6R, 6L. As a bird's-eye imaging processing method on the basis of a through image by conversion of a viewpoint is heretofore well-known, the detailed description is omitted. For example, the through image is a right through image 11R shown in FIG. 6A, an area FT shown by a dotted line in the bird's-eye image is trimmed, and an image FTR shown in FIG. 6B is displayed on the display 9. In this case, in display as a synthetic bird's-eye image, each bird's-eye image is displayed in an area having a substantially parallelepipedic shape as shown in FIG. 4.

Then, when the through image 11R of the camera 6R is trimmed to display on the display 9, the trimmed image FTR is first extracted as shown in FIG. 6B. To produce a planar bird's-eye image, view points are converted and distortion of the image is corrected. The distortion correction of the image is performed by correcting the number of pixels in a direction of the width and in a direction of the depth of the image from an optical axis center using predetermined correction parameters. The planar bird's-eye image shown in FIG. 5A is acquired by this processing. Consequently, as shown in FIG. 6C, pixels on the distant side increase for pixels on the close side of the dump truck 1, simultaneously, in the direction of the width, the number of pixels also increases from the center toward the circumference, and the whole image area is parallelepipedic.

Figure 6A:
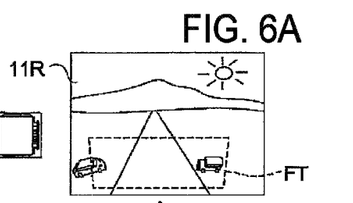
FIGS. 6A to 6E are illustrations showing a process related to a method of generating a planar bird's-eye image on the basis of through images.
Figure 6B:
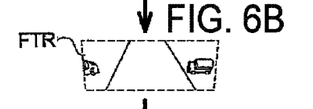
Figure 6C:
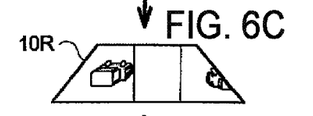
Figure 6D:
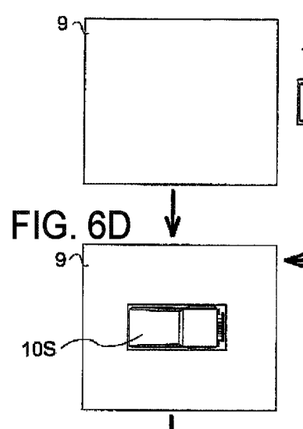
Figure 6E:
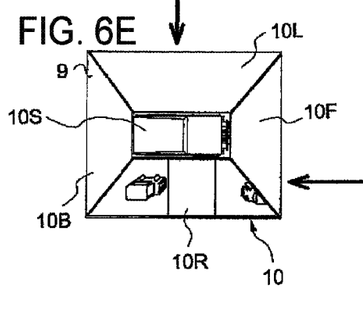

Each through image 11F, 11B, 11L by the cameras 6F, 6B, 6L are also similarly trimmed as shown in FIG. 6B from each through image shown in FIG. 6A and bird's-eye imaging processing is applied to each trimmed through image as shown in FIG. 6C. After the processing, the synthetic bird's-eye image 10 is produced by sequentially displaying each individual bird's-eye image 10F, 10L, 10B, 10R in respective predetermined areas as shown in FIG. 6E in such a state that the vehicle icon 10S is arranged in the center position of the display 9 as shown in FIG. 6D.

The synthetic bird's-eye image 10 is a monitor image around the dump truck 1 and the surrounding monitored image shows whether a person and an object exist around the dump truck 1 or not. An object of surroundings monitoring is workers around the dump truck 1, others and another vehicle. Further, when a construction and others object may exist around the dump truck, these objects can be also monitored.

In short, the display 9 is used for checking whether an object to be monitored is located around the dump truck 1 or not. Accordingly, the object to be monitored is a to-be-monitored image and the to-be-monitored image is required to be securely displayed on the display 9. In addition, an operator is enabled to recognize a position and a direction from the dump truck 1 to the to-be-monitored image and to determine whether the to-be-monitored image may come in contact with operation as haulage means of the dump truck 1, that is, the dump truck in traveling and in steering or not.

In other words, the surroundings monitoring device of the vehicle avoids collision and contact with a to-be-monitored object by definitely displaying a to-be-monitored image requiring monitoring in operation of the vehicle classified into industrial machinery on the display 9 and making an operator operating the industrial machinery recognize the to-be-monitored image and therefore, the surroundings monitoring device makes work smooth and efficient. The to-be-monitored image is accordingly set according to an operating situation of the industrial machinery mounting the display 9.

For example, the dump truck 1 is operated in a work site such as a mine, a working mechanism such as a hydraulic excavator for excavating earth and sand and a wheel loader, a fuel feed vehicle and other various vehicles are located and operated around the dump truck, and under such a situation, these types of vehicles are to-be-monitored images. That is, the to-be-monitored image is an object required to be monitored so as to avoid contact and collision while the vehicle executing monitoring is operated. Furthermore, in a site in which workers act, they are to-be-monitored objects. Further, when an object such as a construction, machinery and tools is arranged around the dump truck, these objects can be also made to-be-monitored images.

When industrial machinery to be an object of surroundings monitoring is operated at a civil engineering works site and is operated in a mine, to-be-monitored images are set according to respective cases. That is, a to-be-monitored image is set according to a site where industrial machinery is operated and besides, a to-be-monitored image varies.

For example, when surroundings of the dump truck 1 operated in amine as a work site are monitored, persons including workers, service vehicles for refilling fuel and others, work vehicles for various maintenance, further, cars and others are included in to-be-monitored images. As a to-be-monitored image has color and a shape different from a natural thing in a work site, the to-be-monitored image can be specified with the natural thing as a reference.

The synthetic bird's-eye image 10 shown in FIG. 4 displays the whole surroundings of the dump truck 1 and an operator can recognize a direction of a to-be-monitored image and distance to the dump truck 1. However, as the to-be-monitored image is displayed on the screen of the display 9 having only a limited display area, it cannot be said that the display is the maximum possible measure even if the display is useful in view of surroundings monitoring.

Figure 7:
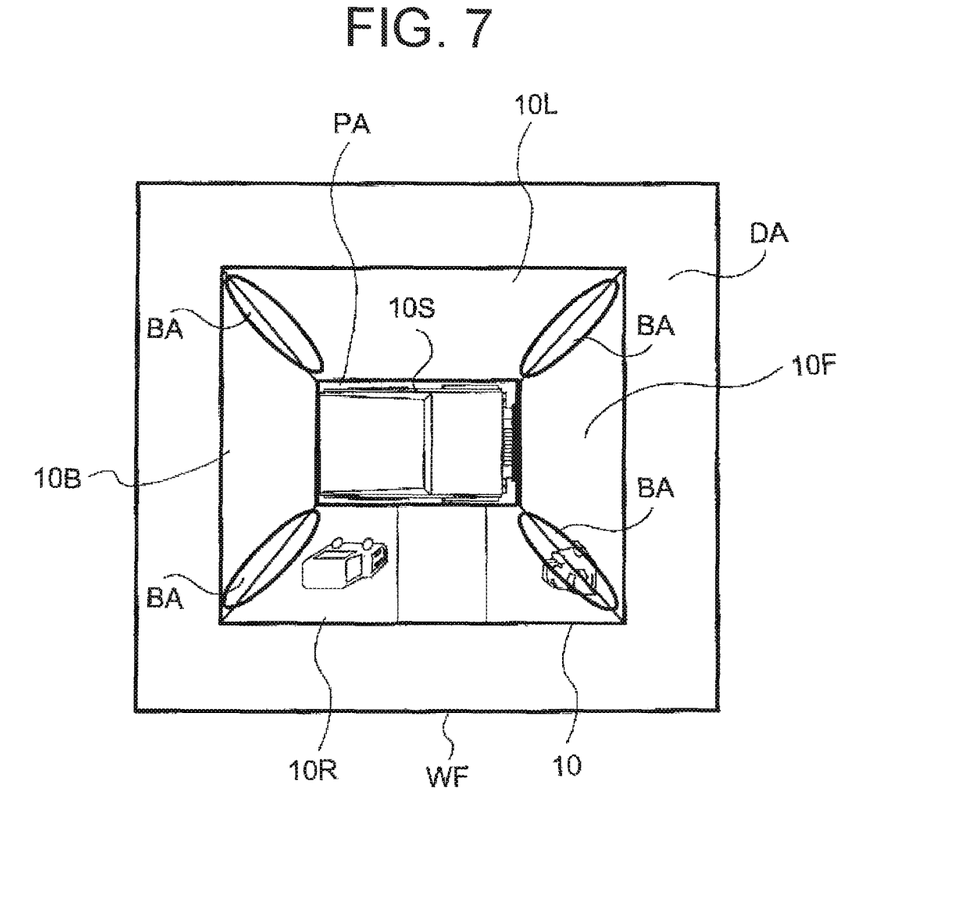
FIG. 7 is an illustration showing a synthetic bird's-eye image displayed on the display and areas undisplayable in the synthetic bird's-eye image.

That is, as shown in FIG. 7, when a work site in which the dump truck 1 is operated is WF, the close side undisplayable area PA displaying the vehicle icon 10S and a limit exceeding undisplayable area DA outside a display area of the synthetic bird's-eye image 10 are a to-be-monitored image undisplayable area out of a range of a monitoring area. In addition to this area, boundaries BA between each individual bird's-eye image 10F and 10L, between 10L and 10B, between 10B and 10R and between 10R and 10F may be also a boundary display lacking area as a to-be-monitored image undisplayable area displaying and lacking no to-be-monitored image.

A to-be-monitored image is normally three-dimensional and has height, however, as to the synthetic bird's-eye image 10, information of the height is represented as length in a visual line direction from the camera 6. As the ground plane L of the dump truck 1 is set as a virtual plane as to the synthetic bird's-eye image 10, a to-be-monitored image is represented like a shadow extended on an extended line in the visual line direction of the camera 6 from a ground position of the to-be-monitored image on the screen of the display 9. Therefore, when a to-be-monitored image is located inside the single individual bird's-eye image, the whole to-be-monitored image is represented in the synthetic bird's-eye image 10, however, when the to-be-monitored image is located in a position close to the boundary BA between mutually adjacent individual bird's-eye images or in a position across the boundary BA, the to-be-monitored image is not definitely displayed.

On the display 9, respective display areas of the bird's-eye images 10F, 10L are restrictive, therefore, areas of these bird's-eye images 10F, 10L are trimmed, however, in trimming, an area cut off from display exists. Therefore, even if the bird's-eye images 10F, 10L connect on the plane of the ground plane L, the whole or a part of to-be-monitored image may lack from the bird's-eye images 10F, 10L or from the boundary BA between these 10F and 10L depending upon a position of the to-be-monitored image. Such omission in displaying the to-be-monitored image is remarkable in the planar bird's-eye image shown in FIG. 5A, in the meantime, information of a portion between each individual bird's-eye image 10F, 10B, 10R, 10L is abundant in the spherical bird's-eye image shown in FIG. 5B, however, though possibility of the omission of the to-be-monitored image is low, the omission of the to-be-monitored image can occur.

As described above, in displaying on the display 9 as a bird's-eye image, the occurrence of the to-be-monitored image undisplayable area cannot be avoided. However, even if the to-be-monitored image exists in any of these to-be-monitored image undisplayable areas, the to-be-monitored image is displayed in any through image. Therefore, as for a to-be-monitored image existing in a cut-off image portion as in a case that a to-be-monitored image exists in a portion cut off in trimming and removed from display, the actual to-be-monitored image or an image acquired by characterizing the actual to-be-monitored image, for example, is required to be displayed.

Moreover, a display area of the display 9 has a limit and a to-be-monitored image may exist in a position out of the limit. As the synthetic bird's-eye image 10 including the vehicle icon 10S and each individual bird's-eye image 10F, 10B, 10R, 10L displays a range required for surroundings monitoring, it does not especially come into question that a to-be-monitored image in a farther position than the display limit of the display 9 is not displayed. However, when a to-be-monitored image is displayed in any through image 11F, 11B, 11R, 11L, it may be desirable that an operator is also made to recognize the to-be-monitored image existing in an area outside the display area of the synthetic bird's-eye image 10 in any method. For example, a situation that the to-be-monitored image in the position is a moving object such as a vehicle and the dump truck moves closer to the vehicle being the to-be-monitored image can be given. In this case, it is desirable that any display is made so as to make an operator recognize access of the to-be-monitored image.

On the basis of the above description, in the image processor 8 shown in FIG. 3, a to-be-monitored image detector 20 is provided so as to detect a to-be-monitored image on a through image and through images 11F, 11B, 11R, 11L of the cameras 6F, 6B, 6R, 6L are aggregated by an image aggregating unit 21. A to-be-monitored image is detected on an intensive screen by a to-be-monitored image search unit 20A and a coordinate position detection unit 20B respectively of the to-be-monitored image detector 20. Next, a synthetic bird's-eye image 10 is generated by an image synthesizer 22, the to-be-monitored image is superimposed on the synthetic bird's-eye image 10 together with a to-be-monitored image index TS generated by a to-be-monitored image index generator 23, and the superimposed image is displayed. That is, the image synthesizer 22 and the to-be-monitored image index generator 23 function as a to-be-monitored image indexing section.

Figure 8:
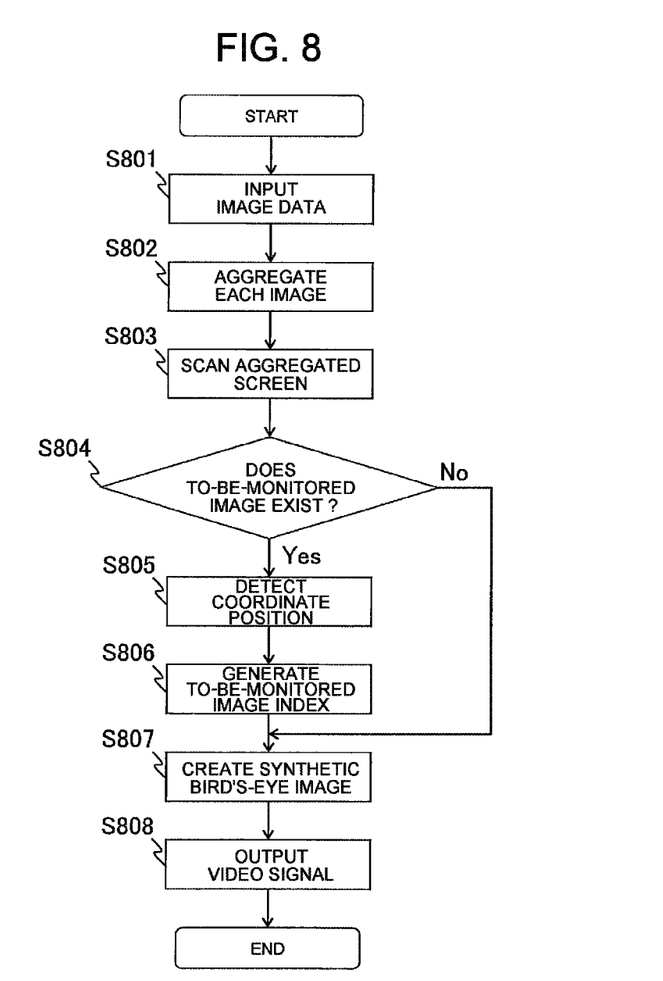
FIG. 8 is a flowchart showing a flow of a through image imaging process by an image processor.

Next, image processing of through images 11F, 11B, 11R, 11L by the image processor 8 will be described in detail, referring to FIG. 8. First, when surroundings of the dump truck 1 are imaged by the cameras 6F, 6B, 6R, 6L, coordinate axes configured by perpendicular two axes are set on the intensive screen in the image aggregating unit 21. Accordingly, image data of the through images 11F, 11B, 11R, 11L of the cameras 6F, 6B, 6R, 6L is input in respective positions on the intensive screen (a step (hereinafter called S) 801), and the image aggregating unit 21 synthesizes the through images 11F, 11B, 11R, 11L of the cameras 6F, 6B, 6R, 6L to be one screen (S802).

Next, the to-be-monitored search unit 20A detects a to-be-monitored image by scanning the intensive screen (S803) and judges whether the to-be-monitored image exists or not (S804). At this time, when it is judged that no to-be-monitored image exists (S804/No), processing in the following S807 is executed.

In the meantime, when it is judged that a to-be-monitored image exists (S804/Yes), its coordinate position is detected by the coordinate position detection unit 20B (S805). The detection of the to-be-monitored image is performed by recognizing color and a shape in through images 11F, 11B, 11R, 11L as described above. When the to-be-monitored image is detected as described above, the to-be-monitored image index TS is generated by the to-be-monitored image index generator 23 (S806).

As described above, four images can be collectively processed and the to-be-monitored image can be detected at high speed. Data of whether a to-be-monitored image exists or not and of its coordinate position are acquired by this process. Moreover, the to-be-monitored image can be also specified by using a method such as pattern recognition. Further, it can be also determined whether the to-be-monitored image moves or not by comparing image data temporally different in the image aggregating unit 21. However, collective processing of four images is not necessarily essential and the to-be-monitored image can be also detected by scanning the individual through image 11F, 11B, 11R, 11L.

The image synthesizer 22 instructs the bird's-eye imaging processing unit 12 to convert view points of through images 11F, 11B, 11R, 11L acquired by the cameras 6F, 6B, 6R, 6L and the image synthesizer inputs data related to the synthetic bird's-eye image 10 configured by the individual bird's-eye images 10F, 10B, 10R, 10L. Moreover, data related to the vehicle icon 10S is also input to the image synthesizer 22.

The coordinate position of the to-be-monitored image detected by the to-be-monitored image detector 20 and data related to the specification of the to-be-monitored image, for example, whether the to-be-monitored image is a person, a vehicle or a fixed thing or not if necessary are also input. Hereby, the image synthesizer 22 generates a synthetic bird's-eye image 10S on the basis of the input data (S807) and outputs its video signal to the display 9 (S808). The image processing of through images 11F, 11B, 11R, 11L is finished by the above-mentioned process.

The video signal from the image synthesizer 22 is input to the display 9, the vehicle icon 10S is located in the center of the display 9, and the synthetic bird's-eye image 10 configured by the individual bird's-eye images 10F, 10B, 10R, 10L is displayed around the vehicle icon 10S. When to-be-monitored images such as vehicles V1, V2 exist in the display area of the synthetic bird's-eye image 10, the to-be-monitored images are superimposed in predetermined positions on the synthetic bird's-eye image 10 together with to-be-monitored image indexes TS on the basis of the data related to the to-be-monitored image detected by the to-be-monitored image detector 20, and the superimposed image is displayed.

The to-be-monitored image index TS is not only added so as to make an operator recognize its undisplayed image because the screen of the display 9 has constraint though display of the to-be-monitored image is required but can be also added to a to-be-monitored image having high possibility that an operator may miss though the to-be-monitored image is displayed on the display 9. When a visual field at the back of the vehicle is to be mainly secured, the vehicle icon 10S can be also biased in front of the screen and the vehicle icon 10S is not necessarily limited to a central position.

In the meantime, when a to-be-monitored image exists in the to-be-monitored image undisplayable area, the to-be-monitored image is also displayed. The to-be-monitored image is displayed in such a state that the image is superimposed on the vehicle icon 10S in the close side undisplayable area PA displaying the vehicle icon 10S, and the similar display is also made in the boundary display lacking area BA. The to-be-monitored image itself can be also displayed and a characterized image may be also displayed.

For a concrete example, one example displaying a to-be-monitored image in the boundary display lacking area BA is shown in FIG. 4. FIG. 4 shows that the vehicle V1 is displayed in a position in the individual bird's-eye image 10R out of the individual bird's-eye images 10F, 10B, 10R, 10L respectively configuring the synthetic bird's-eye image 10 and the vehicle V2 is located in the boundary display lacking area BA between the individual bird's-eye images 10F, 10R. Aside from the vehicle V1, as the vehicle V2 is located in the boundary display lacking area BA, an image of the vehicle V2 are based upon images from the cameras 6F, 6R different in a position and a direction, when an object image is displayed as it is, the image is deformed or is lost partially or as a whole, and the image may be unable to be precisely recognized as a to-be-monitored image.

In FIG. 4, the vehicle V2 is displayed in such a state that a part of a through image 11R is cut out and the to-be-monitored image is encircled by the to-be-monitored image index TS. Hereby, at a glance of the display 9, the vehicle V2 can be recognized. Moreover, an image of the vehicle V1 is displayed without lack, however, in FIG. 4, the to-be-monitored image index TS is also displayed around the vehicle V1. Hereby, the vehicle V1 is also more clearly displayed and the display of the to-be-monitored image on the display 9 can be made outstanding. The vehicle V2 is largely displayed in the image, however, when display of a to-be-monitored image is small, the to-be-monitored image is highlighted, and the display of the to-be-monitored image on the display 9 can be prevented from being missed.

In the meantime, as the limit exceeding undisplayable area DA outside the display area of the synthetic bird's-eye image 10 is located outside the screen of the display 9, the display in the position is impossible. Then, a predetermined mark is displayed on the display 9 so as to make an operator recognize this as a quotation mark. As for the quotation mark, different marks can be also used for a person, a vehicle and the other object as a to-be-monitored image, and the same mark may be also used independent of difference among objects. To enable an operator to recognize distance to a to-be-monitored image, such control that a quotation mark is blinked, blinking speed is retarded in a far position and as the to-be-monitored image approaches, blinking speed is raised can be made. It is natural that as the to-be-monitored image is displayed on the synthetic bird's-eye image 10 when the to-be-monitored image enters the display area of the display 9, the display of the quotation mark is stopped.

In the embodiment of the present invention, the case that the to-be-monitored image index TS encircles the to-be-monitored image with a rectangular frame is described, however, the present invention is not limited to this case, predetermined color may be also applied and a to-be-monitored image may be also encircled by a circle. Moreover, for another to-be-monitored image index, such marks shown in FIG. 9 can be displayed.

Figure 9:
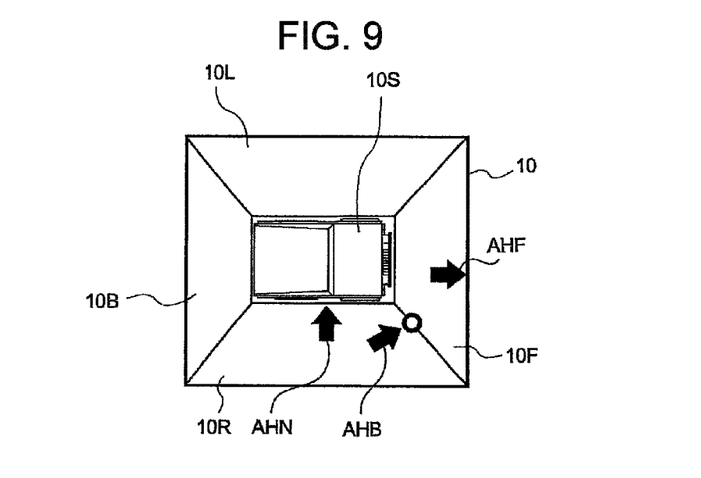
FIG. 9 is an illustration showing an example of a to-be-monitored image index on the planar bird's-eye image.

In FIG. 9, the to-be-monitored image index is formed by an arrow. That is, a to-be-monitored image located inside the close side undisplayable area PA is shown by an arrow AHN in FIG. 9 and hereby, it proves that the to-be-monitored image exists at an end of the arrow AHN under the vehicle icon 10S or in a close position. Moreover, as for the limit exceeding undisplayable area DA, the existence of a to-be-monitored image is displayed by an arrow AHF. It is recognized that the to-be-monitored image exists in a position of an extended line of the arrow AHF.

Further, an arrow AHB displays that a to-be-monitored image exists in the boundary display lacking area BA in the boundary between the bird's-eye images and the arrow AHB displays that the position is shown by a circle. When a to-be-monitored image is moving, it is desirable that a moving direction and moving velocity are displayed on the screen of the display 9. For a display mode, when the moving direction is shown by the arrows AHN, AHF, AHB, an operator can readily grasp the moving direction. Moreover, the moving velocity can be shown by length of the arrows AHN, AHF, AHB, further, the arrows AHN, AHF, AHB are blinked, and when distance between a to-be-monitored image and the dump truck 1 is close, blinking speed can be raised.

Figure 10:
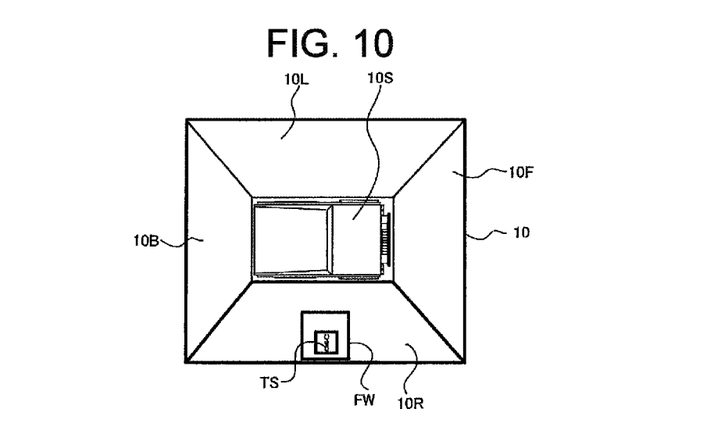
FIG. 10 is an illustration showing one example of a to-be-monitored image index formed when display of a to-be-monitored image is small.

Furthermore, as shown in FIG. 10, there is a case that a to-be-monitored image is a person and at only a glance of the display 9, the to-be-monitored image cannot be recognized though the to-be-monitored image is displayable because the to-be-monitored image itself is extremely small on the display 9. In such a case, an operator can readily recognize the to-be-monitored image by encircling the to-be-monitored image with a square frame FW. The frame FW can be also shown by a dotted line, however, to more intensely attract attention of an operator, it is desirable that the frame FW is large-sized. Moreover, to make an operator recognize a to-be-monitored image, it may be also desirable that the to-be-monitored image itself is large-sized and displayed.

LIST OF REFERENCE SIGNS

1 Dump truck
6, 6B, 6F, 6L, 6R Camera
8 Image processor
9 Display
10S Vehicle icon
10B, 10F, 10L, 10R Bird's-eye image
11B, 11F, 11L, 11R Through image
12 Bird's-eye imaging processing unit
20 To-be-monitored image detector
20A To-be-monitored image search unit
20B Coordinate position detection unit
21 Image aggregating unit
22 Image synthesizer (To-be-monitored image indexing section)
23 To-be-monitored image index generator (To-be-monitored image indexing section)

The invention claimed is:

1. A surroundings monitoring device of a vehicle, as industrial machinery, comprising:
a plurality of cameras configured to capture a plurality of through images of surroundings of the vehicle;
an image processor configured to convert a respective viewpoint of each of the through images to generate a plurality of bird's-eye images, and to generate a synthetic bird's-eye image including a vehicle icon indicating the vehicle using the plurality of respective bird's-eye images; and
a display connected to the image processor and configured to display the synthetic bird's-eye image generated by the image processor,
wherein the image processor is further configured to:
aggregate each of the through images captured by the plurality of cameras on one screen and generate an intensive screen,
when the synthetic bird's-eye image is displayed and when the to-be-monitored image is located on a boundary between two of the plurality of bird's-eye images, respectively cut out a part of the to-be-monitored image included in each of the corresponding through images of the two of the plurality of bird's-eye images and superimpose the respective cut out parts together, as the to-be-monitored image, at a position of the boundary on the synthetic bird's-eye image, and
superimpose an image index surrounding the superimposed cut out parts for enabling recognizing the to-be-monitored image on the synthetic bird's-eye image, and
wherein the synthetic bird's-eve image is displayed on the display with the image index and the cut out parts superimposed thereon.

2. The surroundings monitoring device of the vehicle according to claim 1, wherein:
the plurality of cameras are provided in four locations in a longitudinal direction and in a lateral direction of the vehicle, and
each of the plurality of bird's-eve images is displayed around the vehicle icon with the vehicle icon indicating the vehicle in the center of the synthetic bird's eye image with the cut out parts superimposed thereon.

3. The surroundings monitoring device of the vehicle according to claim 1, wherein the image processor is further configured to:
display a position and a moving direction of the to-be-monitored image.

4. The surroundings monitoring device of the vehicle according to claim 1, wherein the image processor is further configured to:
when the synthetic bird's-eye image is displayed and when the to-be-monitored image is located in a display range of the display, display the to-be-monitored image in a recognizable state,
when the synthetic bird's-eye image is displayed and when the to-be-monitored image is located outside the display range of the display, display the to-be-monitored image with a mark showing a position and a moving direction thereof, and
when the synthetic bird's-eye image is displayed and when the to-be-monitored image located outside the display range enters the display range of the display corresponding to one of the plurality of bird's eye images, stop displaying the mark.

* * * * *